United States Patent
Bryant

(10) Patent No.: US 7,032,913 B2
(45) Date of Patent: Apr. 25, 2006

(54) OPPOSING SPRING RESILIENT TENSION SUSPENSION SYSTEM

(76) Inventor: Peter E Bryant, P.O. Box 370806 3224 Shoreheight, Las Vegas, NV (US) 89137

( * ) Notice: Subject to any disclaimer, the term of this patent is extended or adjusted under 35 U.S.C. 154(b) by 0 days.

(21) Appl. No.: 10/802,499

(22) Filed: Mar. 16, 2004

(65) Prior Publication Data

US 2004/0173986 A1 Sep. 9, 2004

Related U.S. Application Data

(63) Continuation of application No. 09/803,505, filed on Mar. 9, 2001, now Pat. No. 6,761,372.

(51) Int. Cl.
*B60G 16/16* (2006.01)

(52) U.S. Cl. .............. 280/124.179; 280/124.141; 280/124.177

(58) Field of Classification Search ......... 280/124.136, 280/124.135, 124.138, 124.139, 124.141, 280/124.177, 124.179
See application file for complete search history.

(56) References Cited

U.S. PATENT DOCUMENTS

| | | | | |
|---|---|---|---|---|
| 2,160,541 A | | 5/1939 | DuBonnet | |
| 2,955,842 A | * | 10/1960 | Stump | 267/66 |
| 3,049,359 A | * | 8/1962 | Geyer | 280/6.159 |
| 3,111,335 A | * | 11/1963 | Hickman | 280/124.109 |
| 3,201,143 A | * | 8/1965 | Drong | 280/124.179 |
| 3,211,468 A | * | 10/1965 | Flowers | 267/250 |
| 3,486,763 A | * | 12/1969 | Hexel | 267/250 |
| 3,573,703 A | * | 4/1971 | Burks et al. | 29/620 |
| 3,584,856 A | * | 6/1971 | Desbois | 267/34 |
| 3,599,954 A | * | 8/1971 | Yew | 267/44 |
| 3,830,517 A | * | 8/1974 | McNeill | 267/169 |
| 3,901,494 A | * | 8/1975 | Sena | 267/289 |
| 4,081,187 A | * | 3/1978 | Evertz et al. | 267/173 |
| 4,087,115 A | * | 5/1978 | Earle | 280/124.17 |
| 4,108,080 A | * | 8/1978 | Garner et al. | 105/182.1 |
| 4,175,771 A | * | 11/1979 | Muzechuk et al. | 267/220 |
| 4,465,300 A | * | 8/1984 | Raidel, Sr. | 267/225 |
| 4,574,707 A | * | 3/1986 | Hickman | 105/159 |
| 4,744,549 A | * | 5/1988 | von der Ohe et al. | 267/287 |
| 4,817,986 A | * | 4/1989 | Kanazawa et al. | 280/781 |
| 4,997,201 A | * | 3/1991 | Schaible | 280/124.145 |
| 5,263,695 A | | 11/1993 | Bianchi | |
| 5,409,254 A | * | 4/1995 | Minor et al. | 280/124.166 |
| 5,658,006 A | * | 8/1997 | Freeman et al. | 280/124.179 |
| 6,017,044 A | * | 1/2000 | Kawagoe | 280/124.106 |
| 6,105,984 A | * | 8/2000 | Schmitz et al. | 280/124.136 |
| 6,761,372 B1 | * | 7/2004 | Bryant | 280/124.179 |

FOREIGN PATENT DOCUMENTS

| | | | | |
|---|---|---|---|---|
| EP | 1138531 | * | 3/2001 | 280/124.179 |
| GB | 2192246 | * | 6/1997 | 280/124.179 |
| GB | 2205284 | * | 6/1997 | 280/124.179 |

* cited by examiner

*Primary Examiner*—Paul N. Dickson
*Assistant Examiner*—Toan To

(57) ABSTRACT

A suspension and method applies the unsprung weight of the wheels and axles to reduce the motion of the sprung weight of chassis. The suspension has a load bolster supporting the sprung weight at a ride height and a rebound member between the wheel axle support and the chassis. The rebound member is to exert increasing force with motion of the sprung weight away from the axle but the member reduces its force on the load bolster during jounce.

5 Claims, 12 Drawing Sheets

OPPOSING SPRING RESILIENT TENSION SUSPENSION SYSTEM

This is a continuation of U.S. patent application Ser. No. 09/803,505 filed on Mar. 9, 2001 now U.S. Pat. No. 6,761, 372. This relates to an opposing spring suspension including a resilient tension member between the chassis and/or body and each wheel axle support. More particularly, each resilient tension member uses the unsprung weight of the wheel/axle to help resist the rebound travel of the suspension and so reduce the chassis and/or body side sway and pitching forward and aft due to hard acceleration and deceleration.

BACKGROUND OF THE INVENTION

In the past ten years the numbers of sport utility vehicles "SUV" and pickup trucks have increased dramatically to the point where those vehicles are more popular than the millions of passenger cars on the road. The SUV and trucks inherently have a higher center of gravity than normal passenger cars due to the need for higher ground clearance for bad weather travel (snow and ice), off-road use and/or for pickup truck payloads. Typically these vehicles have a higher center of gravity and so a greater propensity to sway or even rollover during abrupt lane changes and evasive steering maneuvers than the lower normal passenger cars.

One important arrangement of all these vehicles is the method of suspension used. Except for the use of hydraulic shock absorber damping resistance to rebound, all suspension have the vehicle chassis and body load supported on the vehicle axles with various types of springs that resist primarily load and jounce of each wheel axle. All existing coil springs, leaf springs, air springs, torsion bars or rubber blocks suspensions have no provision for control of the rebound forces of inertia and gravity negative suspension loads. Particularly, those rebound loads occurring at the inside wheel during hard cornering or if a wheel drops into a pot hole.

Typically, changes in suspension loads while driving straight along a road are caused generally by reactions to bumps, pot holes, and roughness encountered by the vehicle wheels during their interaction with the road surface. Thus the suspension springs and associated shock absorbers quell the harshness and movements being transmitted to the body and chassis.

The sway or side to side rolling motions that vehicles experience due to cornering forces, also cause vehicle springs to be loaded or unloaded, depending which way the vehicle is rolling during cornering. Many vehicles have an anti-sway/roll bar installed to help the vehicle body resist the rolling actions. These devices help somewhat the vehicle resist roll but only as it relates to the body lean, because they are fixed to the sprung mass and leaning with the body. Thus, they actually reduce the load on the unloaded side of the vehicle. They use the body as a structure to support the torsion bar of the anti sway system transferring wheel jounce motion across to the opposite side. The disclosure herein will obviate the need for anti-sway bars saving the cost of providing and installing them. Shock absorbers only dampen the bouncing movement of the vehicle wheels and suspension caused by the reaction to road surface, cornering and braking. Thus, the rate of sway may be affected to a minor degree.

The transitory effects of body roll during cornering compress the springs on the side of the vehicle following the outside of the turn due to increased transfer weight to that side. Meanwhile the springs on the side of the vehicle, following the inside of the turn, unload extending toward their free position using the axle as a location for inducing lift of the sprung weight on that side resulting in increased body roll. Roll or sway during sudden cornering or evasive maneuvers rotates the vehicle and its center of gravity "CG" around the Roll Center axis. The Roll Center axis is a function of the particular vehicles suspension geometry. Roll or sway is increased if the CG is raised as in a SUV, four-wheel drive vehicle or truck.

A sudden turn opposite the direction of vehicle travel can cause momentum to continue the sway of the vehicle forcing its CG to move laterally past its maximum upright position, and so the vehicle continues on rolling and overturns. U.S. Pat. No. 2,160,541 has a paired spring suspension connected in series to only support load and jounce with the added spring coupled in line with the main spring for increasing the effective spring constant at the extremes of suspension travel. The techniques disclosed in the various embodiments of '541 are in the nature of an overload spring that engages and changes the spring constant at the extremes of wheel travel. There is no spring in '541 connected to specifically resist rebound forces due to diverging motion of the sprung weight to unsprung weight. The disclosure of '541 specifically states that the higher spring constant results in less flex (on page 2 column 1 at lines 6 to 8), " . . . which opposes any tendency of the vehicle to overturn laterally when negotiating a turn." In each embodiment of '541 the springs act in unison to control primarily load and jounce and there is no teaching of a particular connection to directly apply rebound reaction of unsprung weight to one of the springs. The graph in '541 showing wheel travel verses spring forces verifies these conclusions. U.S. Pat. No. 5,263,695 discloses a refinement of the '541 teaching that includes a shock absorber for damping motion and an elastic block to ameliorate the transition between first and second springs for carrying the load. In addition to many disclosures in '695 of prior paired spring configurations there is a specific explanation in column 5, lines 1 through 5 as follows:

"The suspension according to the invention produces a comfort level which is higher the more the transition from one stiffness to the other takes place progressively (see the patents cited in the state of the art)."

The state of the art referred to includes prior patents of the same inventor and the acknowledgements of those prior patents clearly identifies the teachings as merely two springs of different stiffness in series. Even in FIG. 7 of '695 the springs are concentrically mounted but act in series, see column 4, lines 8 through 12. At best the structures for multiple springs shown in these patents have differing spring rates to give an allegedly more comfortable ride.

No existing suspension system suspends the chassis and/or body between opposing springs to counter load and jounce and reaction and rebound along different portions of the axle and wheel travel. An opposing spring suspension can have little effect on the ride stiffness but stabilizes cornering and evasive maneuvering sway by helping the vehicle to resist roll while maintaining the general ride quality.

SUMMARY OF THE INVENTION

A vehicle opposed spring system is preferably placed between a chassis having a sprung weight and a plurality of wheel axle supports each carrying and a portion of an unsprung weight. Sprung weight and unsprung weight are defined at the web site, inner auto.com as follows:

"Sprung" weight is a term used to describe the parts of a vehicle that are supported by the front and rear springs. They suspend the vehicle's frame, body, engine, and the power train above the wheels. These are quite heavy assemblies. The "unsprung" weight includes wheels and tires, brake assemblies, the rear axle assembly, and other structural members not supported by the springs."

The opposed spring system may include a resilient load bolster mounted between the chassis and the wheel axle support to carry when preloaded the chassis at a preset ride height relative to the wheel axle support. A resilient member affixed between each wheel axle support and the chassis preferably exerts increasing force there between as a function of the amount of motion of the unsprung weight relative to the chassis. The resilient member mounted to move between the chassis and the wheel axle support. The resilient member most preferably applies increasingly less force to the resilient load bolster during jounce beyond the preloaded preset ride height of the resilient load bolster and the resilient member increasingly resists the motion of unsprung weight on the wheel axle support.

The resilient member has a free length of travel that operates in cooperation with the resilient load bolster jounce deflection so the free length of travel and the jounce deflection overlap when the resilient member moves between the chassis and the wheel axle support. The chassis preferably has a substantially rectangular footprint having four wheels disposed generally to carry the corners thereof with each corner having its wheel axle support moveably carried by its resilient load bolster and its resilient member to resist jounce and rebound, respectively. A shock absorber can be located between and affixed to the chassis for each wheel axle support for damping the jounce and rebound motions there between progressively decreasing the frequency of the wheel axle support motion.

The resilient member is most preferred to be a coil spring having its free length of travel preloaded with tension sufficient to maintain its connection between the chassis and the wheel axle support even when the resilient load bolster is compressed to its maximum load capacity. The resilient member alternatively might be an elastic member having its free length of travel stretched sufficiently between the chassis and the wheel axle support to attach thereto even when the resilient load bolster is compressed to its maximum load capacity. The resilient member could be a torsion spring with torque preloaded sufficiently between the chassis and the wheel axle support to maintain connection there between even when the resilient load bolster is compressed to its maximum load capacity.

The resilient load bolster preferably has an elastic constant of K to carry sprung weight on the wheel axle support and the resilient member has an elastic constant $K_T$ for resisting the rebound motion of the sprung weight over the wheel axle support. The relationship of the elastic constant of K to carry sprung weight for jounce and the elastic constant $K_T$ for resisting the rebound motion of the sprung weight is a function of the amount of roll resistance.

A preferred vehicle opposed spring system is placed between a chassis wherein a sprung weight and a plurality of wheel axle supports each carrying a portion of an unsprung weight. The opposed spring system preferably has a coil load spring mounted between the chassis and each wheel axle support to carry when preloaded the chassis at a preset ride height relative to each wheel axle support. A coil tension spring is most preferably affixed between each wheel axle support and the chassis exerts increasing force thereat as a function of the amount of rebound motion of the sprung weight. The coil tension spring mounts relative to the coil load spring for stretching between the chassis and the wheel axle support. The coil tension spring applies increasingly less rebound force to the coil load spring during jounce through and beyond the preset ride height of the coil load spring as each coil tension spring resists the rebound motion of sprung weight at each wheel axle support.

Each coil load spring is coaxial with its respective load spring axis disposed approximately normal to the chassis and each wheel axle support. Each coil load spring has a concentric volume defined thereby and located there within for disposition of its coil tension spring there within its concentric volume for movement therein without binding with the coil load spring during jounce and rebound.

Each coil load spring may alternatively be coaxial with a load spring axis disposed approximately normal to the chassis and each wheel axle support. Each coil tension spring is then preferably spaced apart from the coil load spring and is disposed along a tension spring axis generally parallel to the load spring axis of each coil load spring. Each coil tension spring may move relative to its respective coil load spring during jounce and rebound.

An alternative may have a plurality of coil control springs affixed between each wheel axle support and the chassis for exerting increasing force thereat as a function of the amount of rebound motion of the sprung weight of the chassis. Each coil control spring can oppose its respective coil load spring applying increasingly less rebound force thereto during jounce through and beyond the preset ride height of the coil load spring as each respective coil control spring resists the rebound motion of sprung weight over its respective wheel axle support. A path is preferably defined by each of the lines between the chassis and the wheel axle support. Along each path each coil load spring and its respective coil control spring jounce and rebound. The coil control spring has preferably has a free length of travel that cooperates with the coil load spring jounce deflection along the path so the free length of travel along the path and the jounce deflection along the path overlap.

Each wheel axle support may have a rod fixed to the chassis extending along the line for supporting a suspension platform. Each suspension platform is most preferably disposed in compression and for reciprocation along the path with and between the coil load spring and the coil control spring during jounce and rebound and the suspension platform affixed to the wheel axle support.

The opposing spring suspension preferably has two opposing springs that seek to keep the vehicle stabilized in a predetermined sprung position of height relative to the wheel axle system of the vehicle. This sprung position is preferably arrived at by using a compression spring of a known rate per inch in series with and a tension or compression spring also of a known rate per inch, that through their opposition, position chassis at a neutral location arrived at as the result of the sum of the opposing forces. A simpler illustration of what happens can be understood by imagining a paper clip suspended between two extended rubber bands stretched in opposite directions tethering the clip between their ends. Motion of the paper clip toward one rubber band end would shorten that rubber band and lengthen the other. Releasing the tension on the paper clip returns it to its former location between the two stretched bands. This simple demonstration shows how the vehicle has the capability to quickly return to a constant ride height position relative to the ground. This capability should vastly reduce the tasks to be performed by the standard equipment shock absorbers of the vehicle and in fact increase shock life expectancy dramatically, due mainly to reduced use and associated heat.

BRIEF DESCRIPTION OF THE INVENTION

Figure 6:
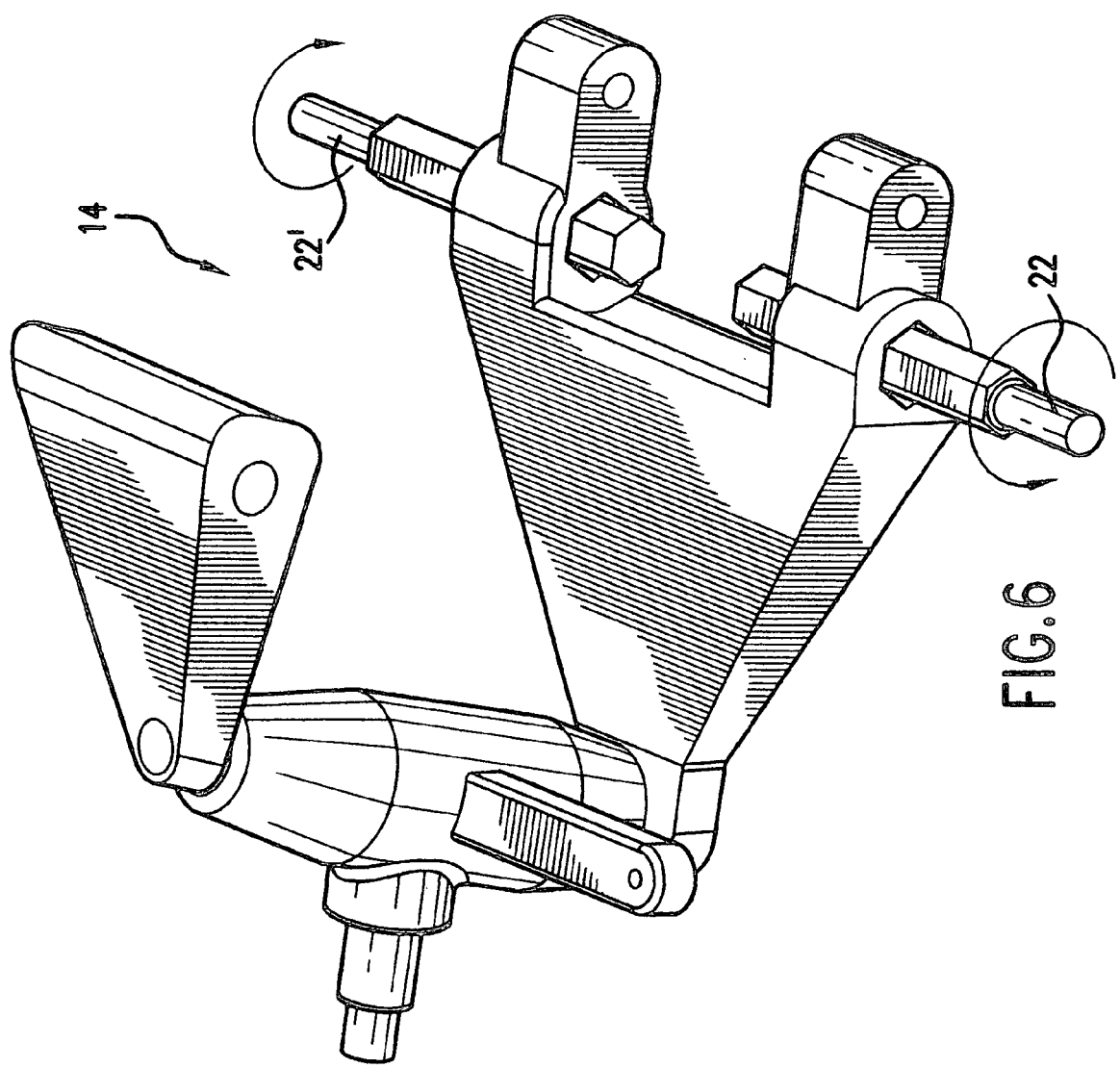

FIG. 6 is a partial perspective view of a front independent suspension shown apart from chassis. A lower suspension 'A' arm reacts to the chassis loads via torsion bar springs. Arrows at the end sections of the 2 opposed torsion bars indicate the direction of wind-up due to pre-load and show how the opposite torsion bars are used.

Figure 7:
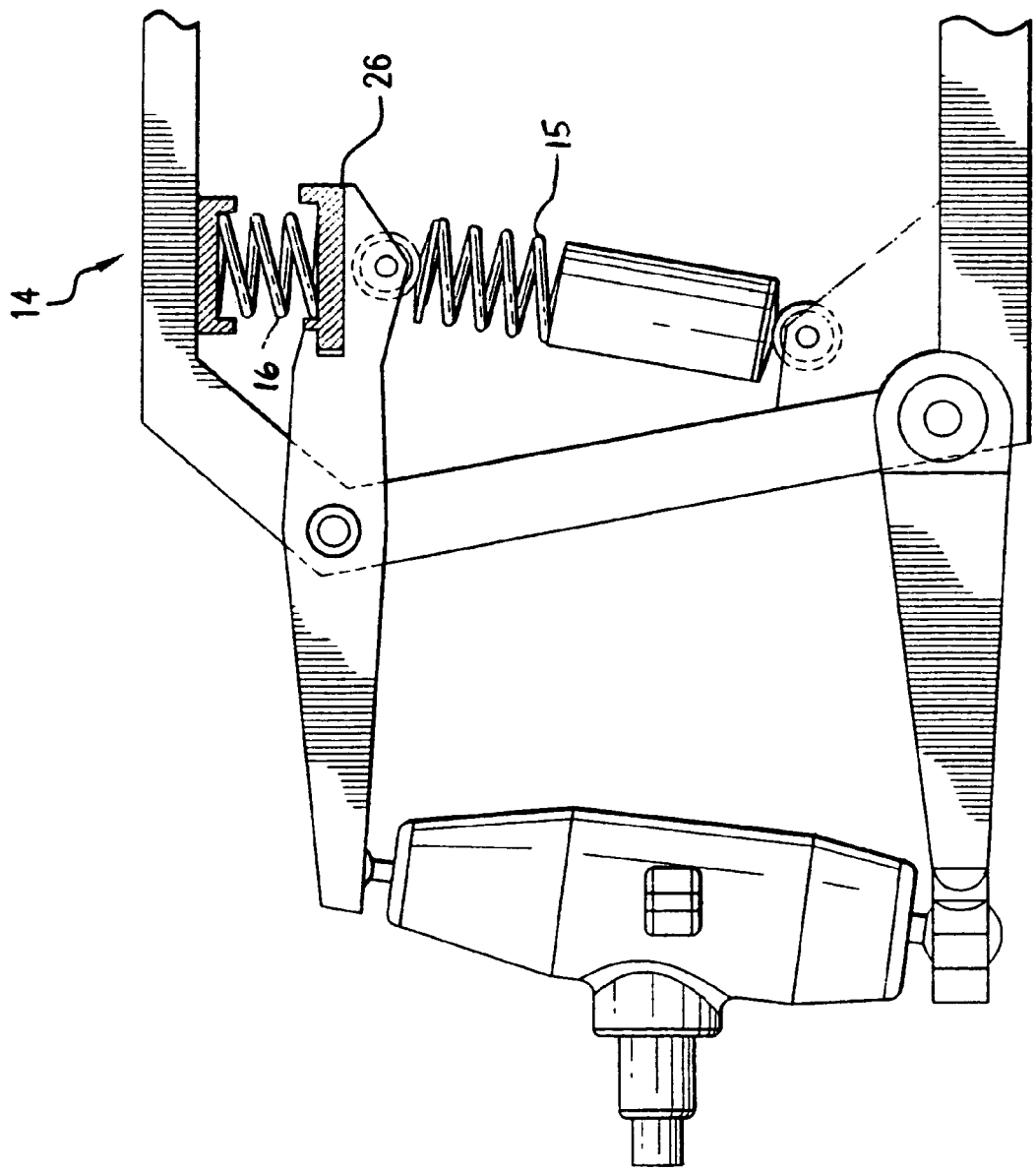

FIG. 7 is a front view of an in-board rocker arm racing car suspension. A conventional type of coil spring/shock absorber unit supports the sprung mass with an opposing compression spring placed between the chassis and the rocker arm.

Figure 8:
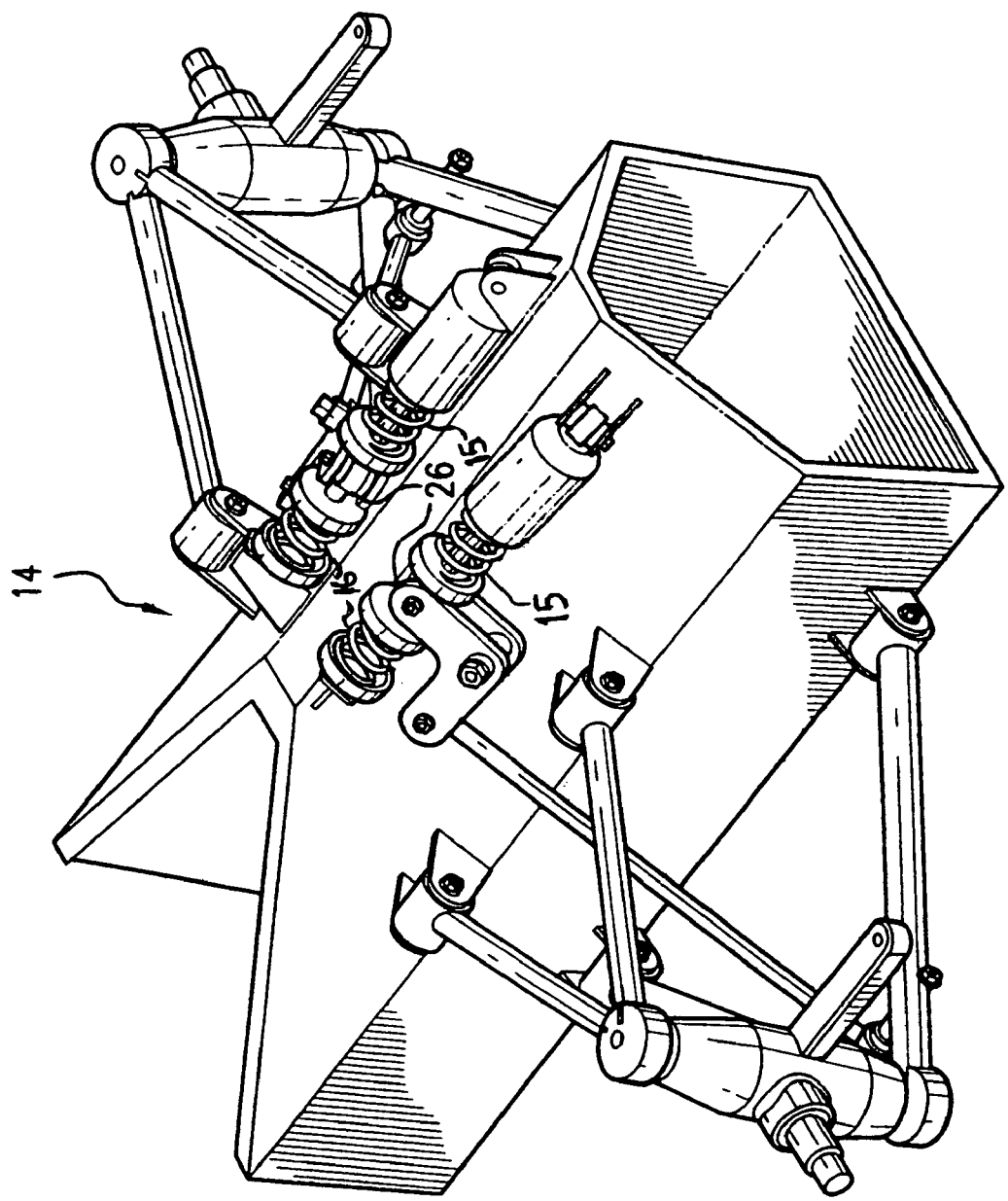

FIG. 8 is a schematic showing a front part of a racing chassis with push-rod type inboard suspension. Spring/shock units each moved by a bell crank have the opposing spring mounted on the opposed side of the bell-crank arm.

Figure 9:
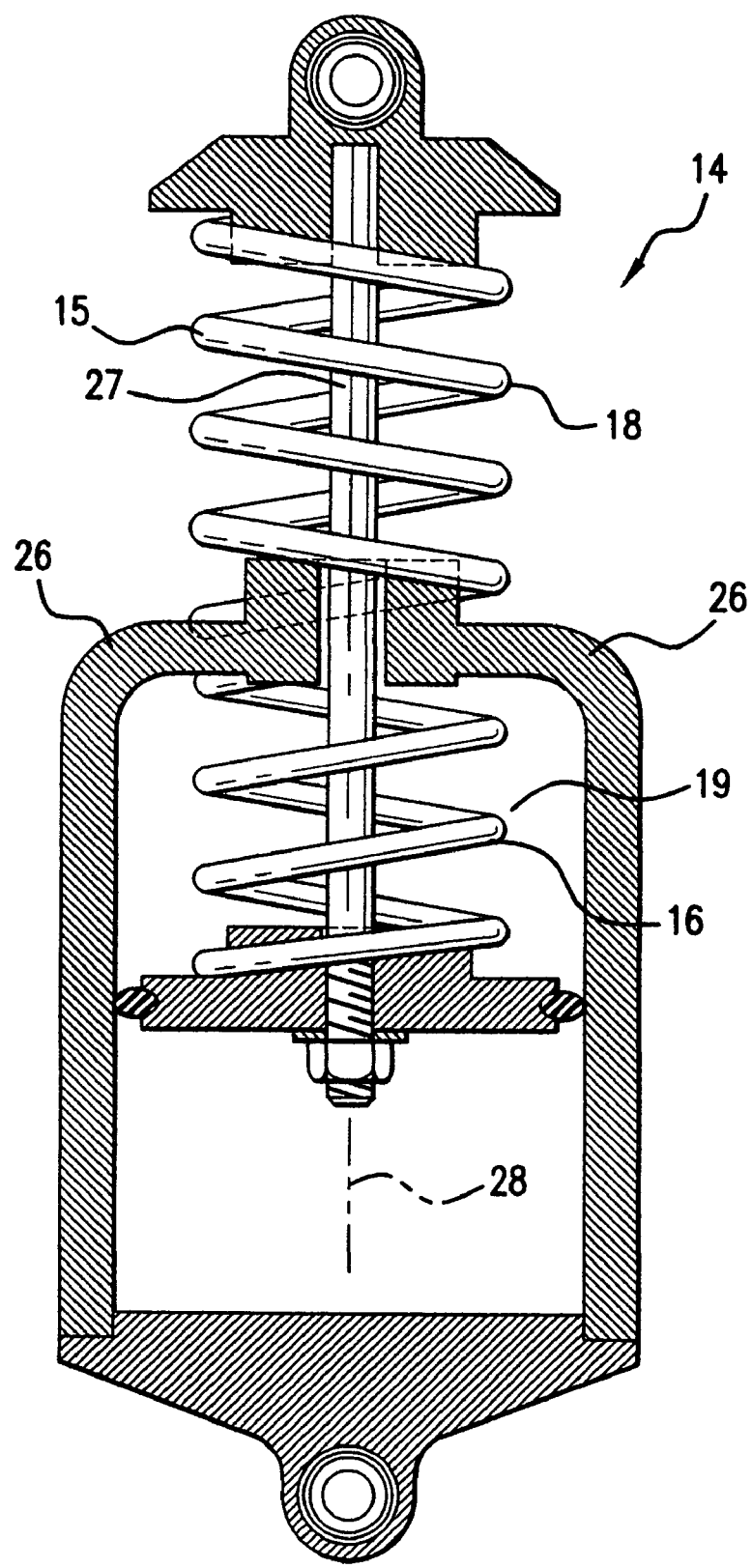

FIG. 9 is a schematic view in section of an opposing spring resilient tension suspension system unit. The compression spring is above separated from its opposing spring by a floating platform that connects to the wheel axle support. A standard type shock absorber (not shown) can be part of the floating platform member. The spring/shock and floating platform of FIG. 8 can be substituted with the opposing spring unit as shown in FIG. 9 and with an integral shock absorber, therein eliminating the mounting of the second compression spring on the opposite side of the bell crank.

Figure 10:
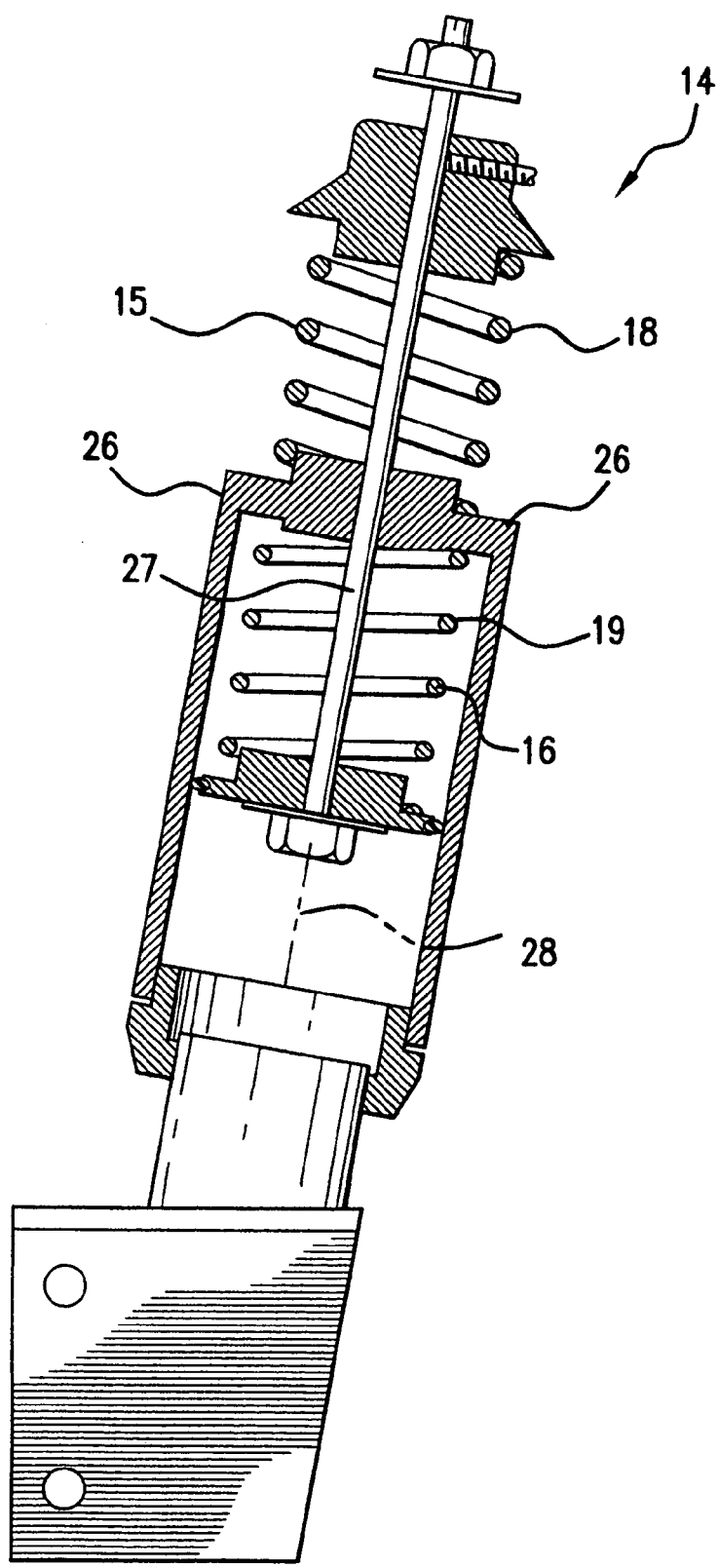

FIG. 10 is a schematic view of a strut suspension assembly with opposed springs like that of FIG. 9.

Figure 11:
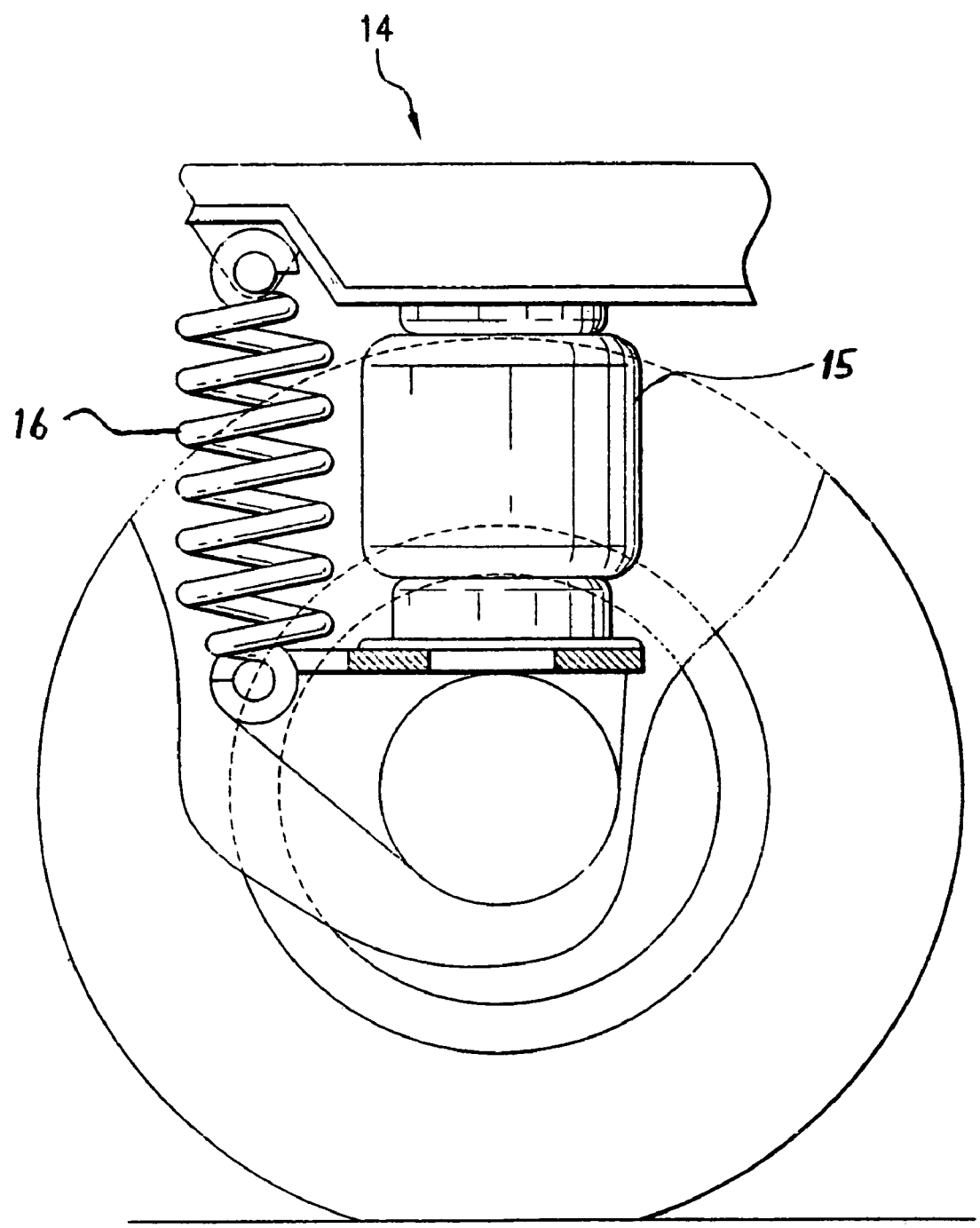

FIG. 11 is a side view of the opposed spring suspension having air-bag compression and coil tension springs mounted side by side on a wheel axle support.

Figure 12:
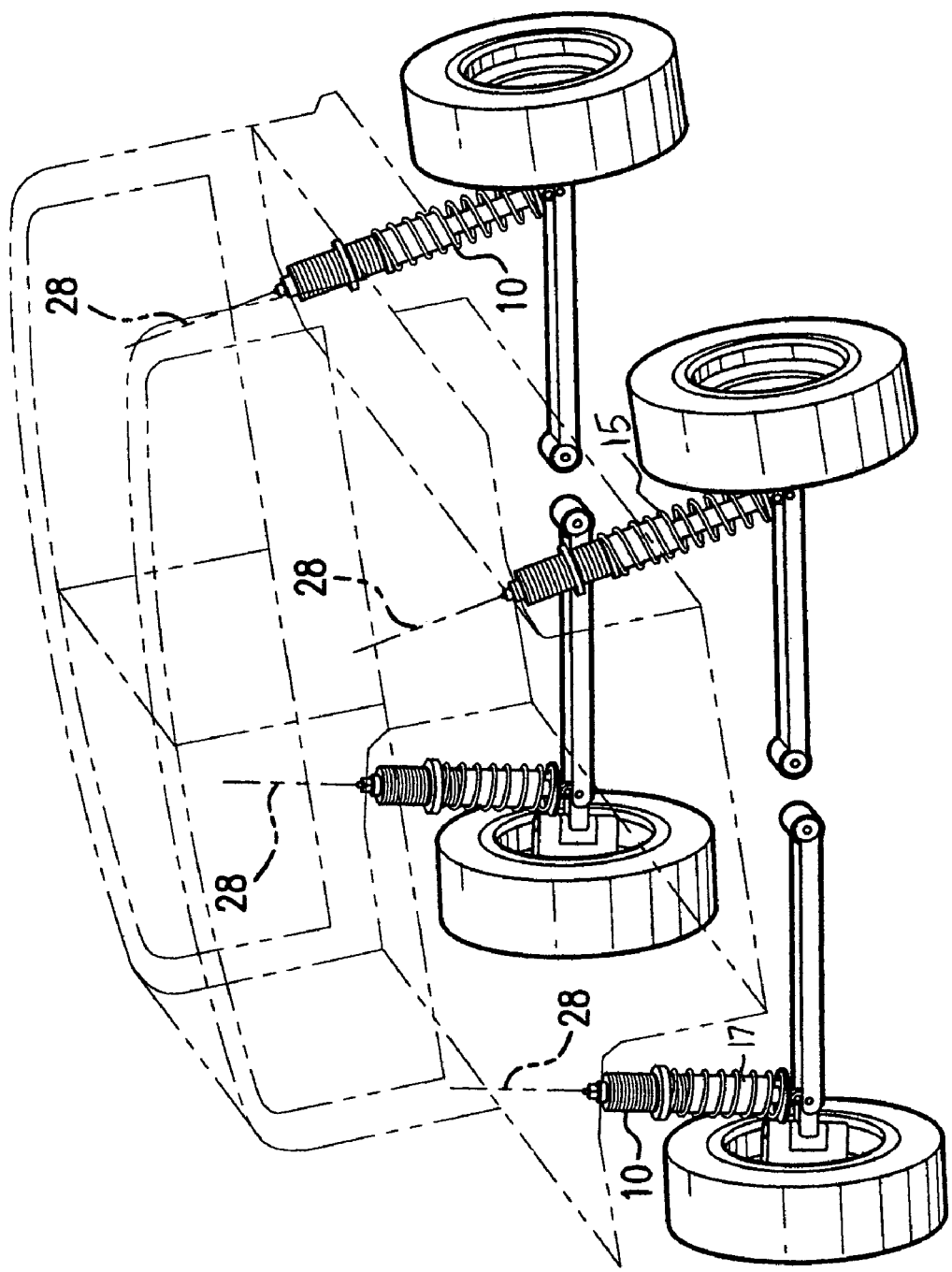

FIG. 12 shows schematically four wheel one at each corner of the chassis whereat the suspension of the invention may be located.

DETAILED DESCRIPTION OF THE INVENTION

Figure 1:
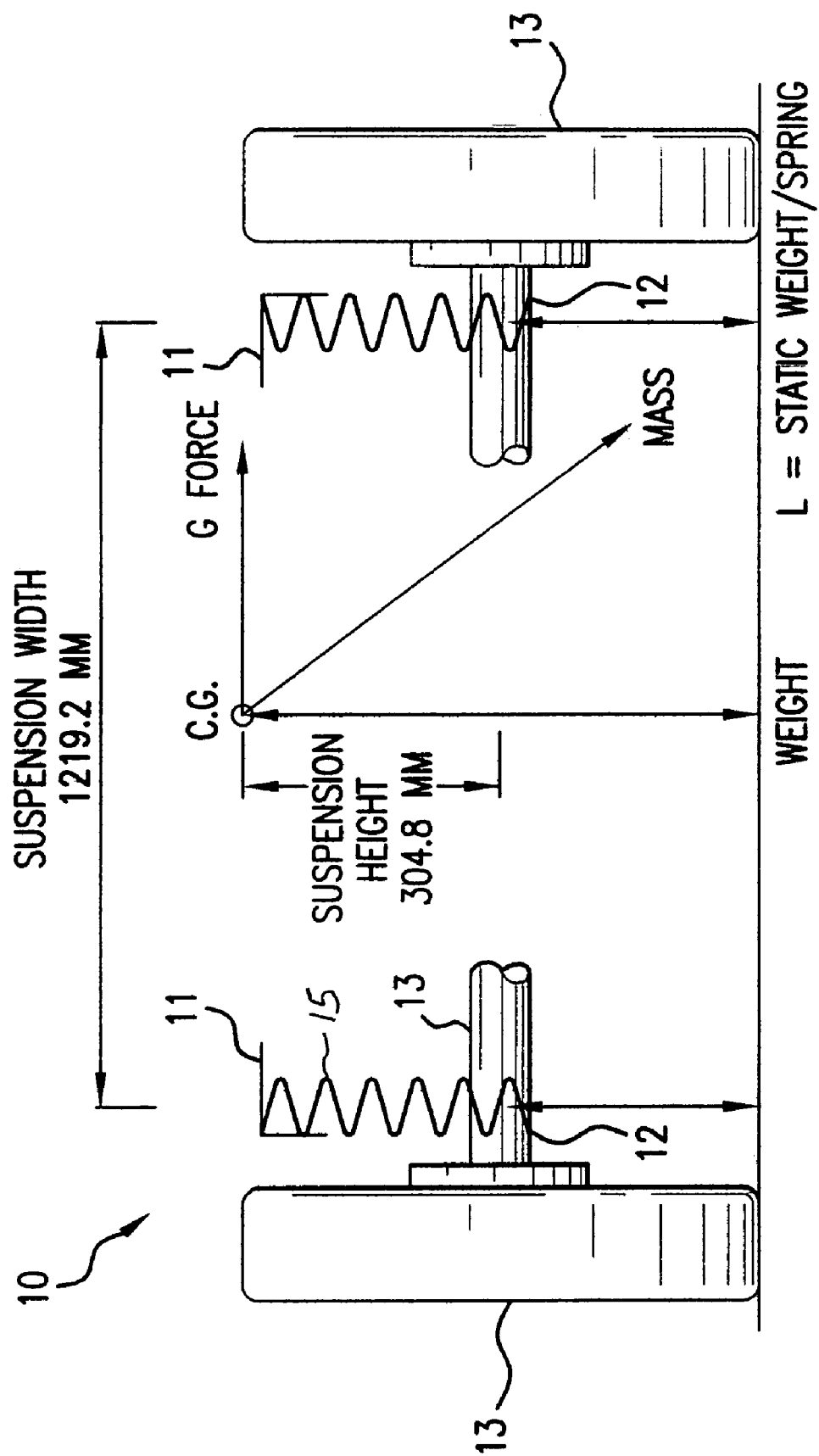
FIG. 1 is a schematic front view of an axle with the geometric parameters thereof shown for purposes of illustrating the relationship of the parameters.

A vehicle spring system 10 is schematically shown in FIG. 1 placed between a chassis having a sprung weight 11 and a plurality of wheel axle supports 12 each carrying a portion of an unsprung weight 13. As used through this disclosure the term chassis 11 refers to that which is carried by each of the one or more the wheel axle supports 12 as sprung weight. The meanings of the terms "chassis and/or body" or "chassis/body" in the originally filed application are the parts of the vehicle that ride on the springs so the weight thereof is carried. Those combined terms seek to cover vehicles with separate frames, those with unitized bodies and those constructed with a unitized body with or without front and rear sub frames to carry the axles. An opposed spring system 14 includes a resilient load bolster 15 such as for example a coil, air, elastic, torsion or leaf spring, FIGS. 3 to 11. The resilient load bolster 15 mounts between the chassis 11 and the wheel axle support 12 to carry, when preloaded; the chassis 11 at a preset ride height relative to the wheel axle support 12, see coil springs in FIGS. 3 through 11. A resilient member 16 such as tension or compression air or coil springs elastic restraints are mounted affixed between each wheel axle support 12 and the chassis 11, FIGS. 3 to 11. The particular resilient member 16 exerts increasing force there between as a function of the amount of motion of the unsprung weight 13 relative to the chassis 11.

Figure 2:
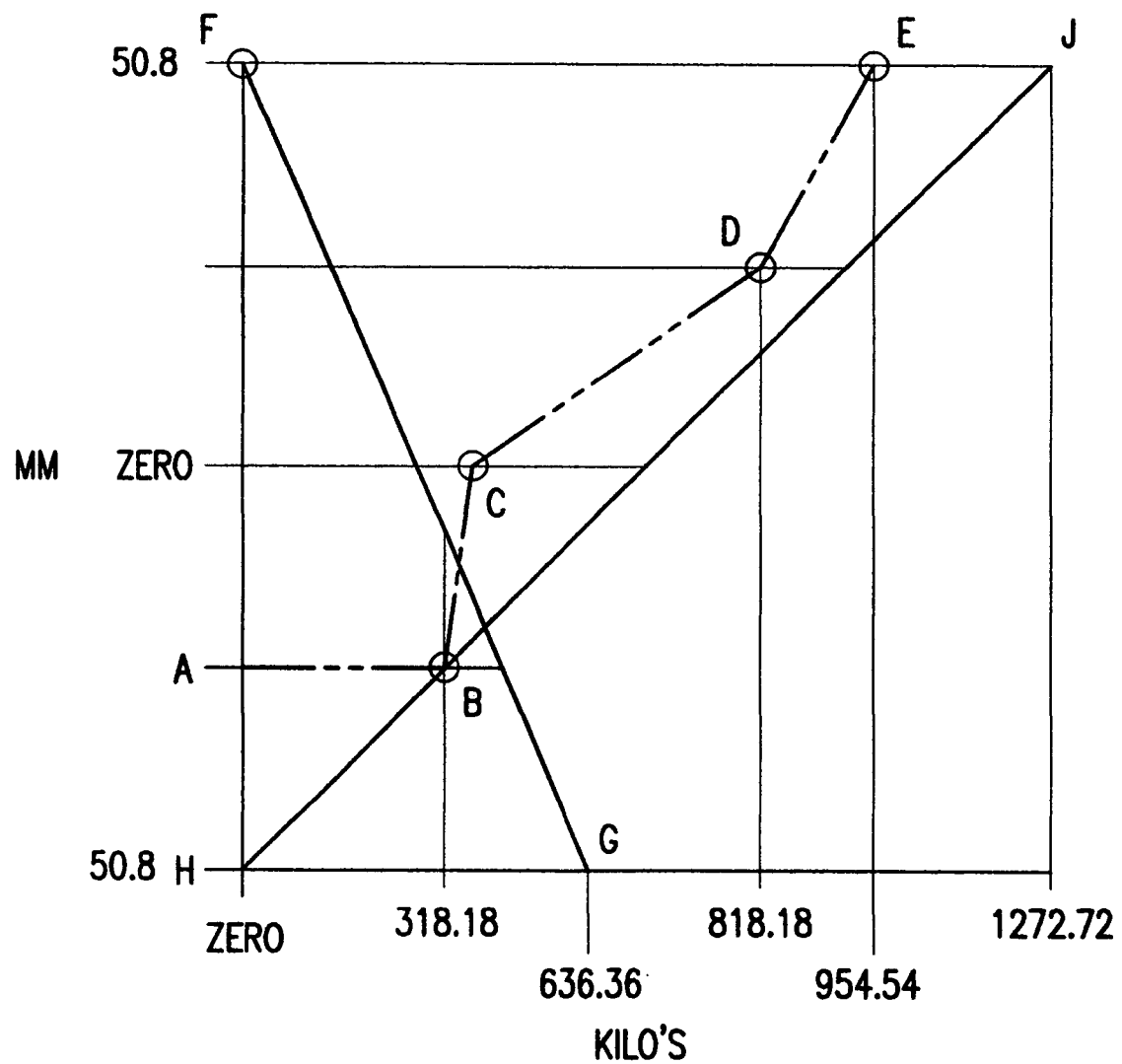
FIG. 2 is a graph with the suspension travel along the vertical axis and the load along the horizontal axis showing force per unit of travel of a conventional suspension relative to the opposed spring suspension of the present disclosure. It also shows that as the axle jounces due to increased 'G' forces the opposing spring effect is reduced.

Illustrated on the graph of FIG. 2 the relative opposing spring effects of the resilient load bolster 15 and the resilient member 16 are shown with respect to a typical compression load supporting suspension between points H and J as a straight line. The respective travels of each of the resilient load bolster 15 and the resilient member 16 overlap giving each its particular control of the wheel axle support 12 movement relative to the chassis and body 11 along a part of its travel. The resilient member 16 mounts to move between the chassis 11 and the wheel axle support 12 opposite the movement of the resilient load bolster 15. The resilient member 16 is located so that it applies increasingly less force to the resilient load bolster 15 during jounce beyond the preloaded preset ride height of the resilient load bolster 15. Similarly the resilient member 16 increasingly resists the motion of unsprung weight on the wheel axle support 12 between points F and G in FIG. 2. The sum total of the two curves shown in FIG. 2 is between points A and E. Specifically, the curve shown between points A and E are the result of the combination of the resilient member 16 load curve between points F and G and the resilient load bolster 15 load curve shown between points H an J. Contrary to the graphs of the prior patents discussed in the background herein the sum total of the two curves is markedly different between points A to B and B to C in FIG. 2. Note that there is no vertical travel between points A and B. This is a significant indication that the unsprung weight 13 is resisting the motion of the chassis and body 11 away from the wheel axle support 12. Heretofore the suspension designers goal was to minimize the unsprung weight 13 relative to the sprung weight 11 to reduce momentum effects of the wheel axle support 12 in motion. Thus, no one had thought to use the weight thereof to oppose sway (roll) or pitch of the chassis and body 11. Consequently, the resilient member 16 has a free length of travel that operates in cooperation with the resilient load bolster 15 jounce deflection so the free length of travel and the jounce deflection overlap when the resilient member 16 moves between the chassis 11 and the wheel axle support 12.

The chassis 11 has a substantially rectangular footprint having four wheels disposed generally to carry the corners thereof with each corner having its wheel axle support 12 moveably carried by its resilient load bolster 15 and its resilient member 16 to resist jounce and rebound, respectively see FIG. 12. A shock absorber 17 can be located between and affixed to the chassis 11 for each wheel axle support 12 for damping the jounce and rebound motions there between progressively decreasing the frequency of the wheel axle support 12 motion, FIG. 3. The shock absorber 17 can be coupled to the resilient load bolster 15 and/or the resilient member 16 as a coil over system or a coil in line suspension, see FIGS. 7 and 10. Also the shock absorber 17 can be free standing separated from the opposed resilient load bolster 15 and resilient member 16 and positioned to maximize its dampening effects and simplify its replacement, since that is conventional it is shown in FIGS. 7 and 8. Regarding the latter, McPherson struts combine the load carrying, shock absorber and the turning functions in one complex assembly, FIG. 10 shows that sort of suspension with opposed springs. The opposed spring suspension 14 can be adapted to that as will be shown and described herein. All kinds of suspension layouts can be used with the opposed spring suspension 14.

Figure 3:
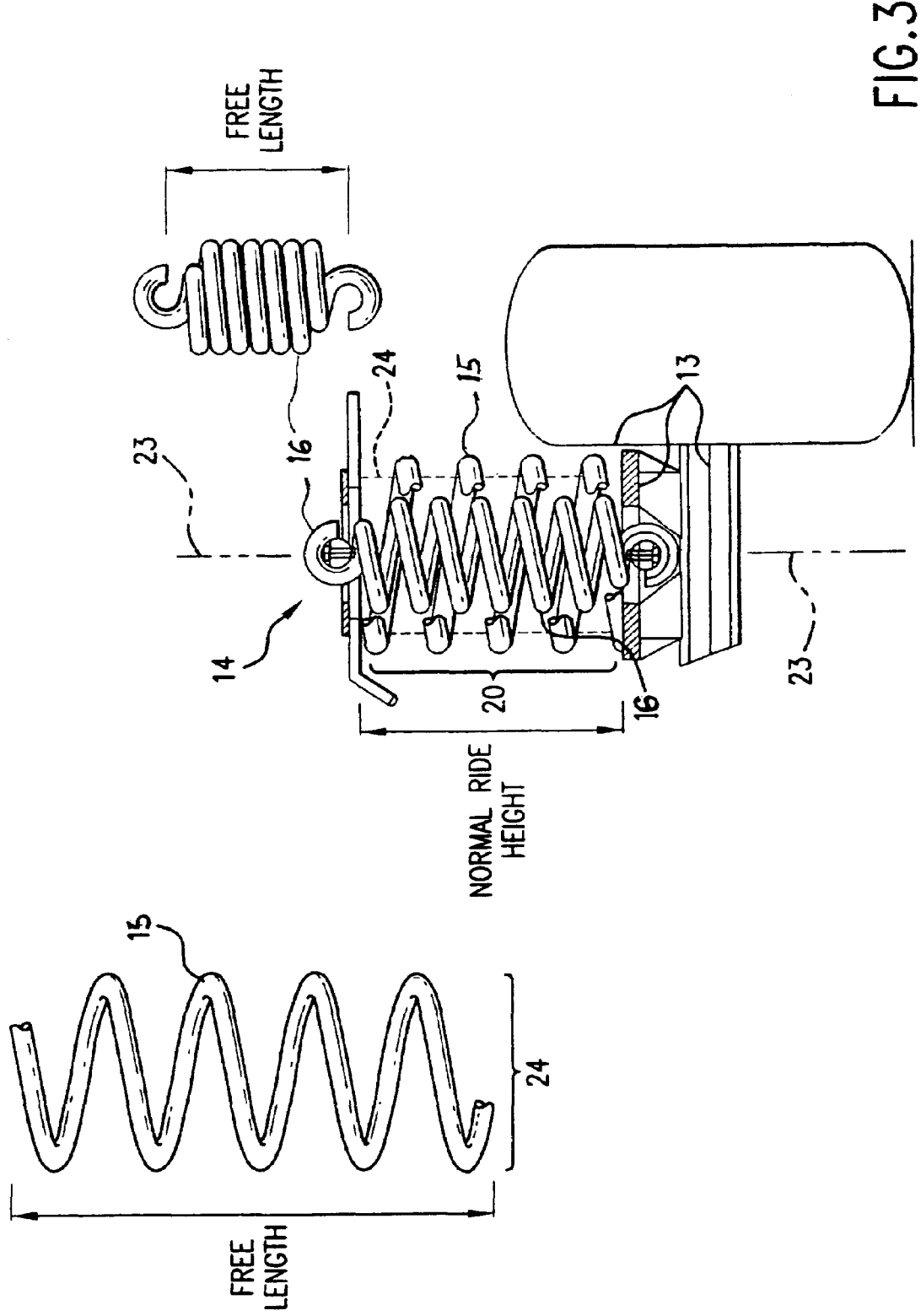
FIG. 3 is a front view of the opposed spring suspension having coil compression and tension springs mounted coaxial and concentrically in an assembled relationship and for clarity the respective coil springs in their free length condition are shown individually aside the assembly.
Figure 4:
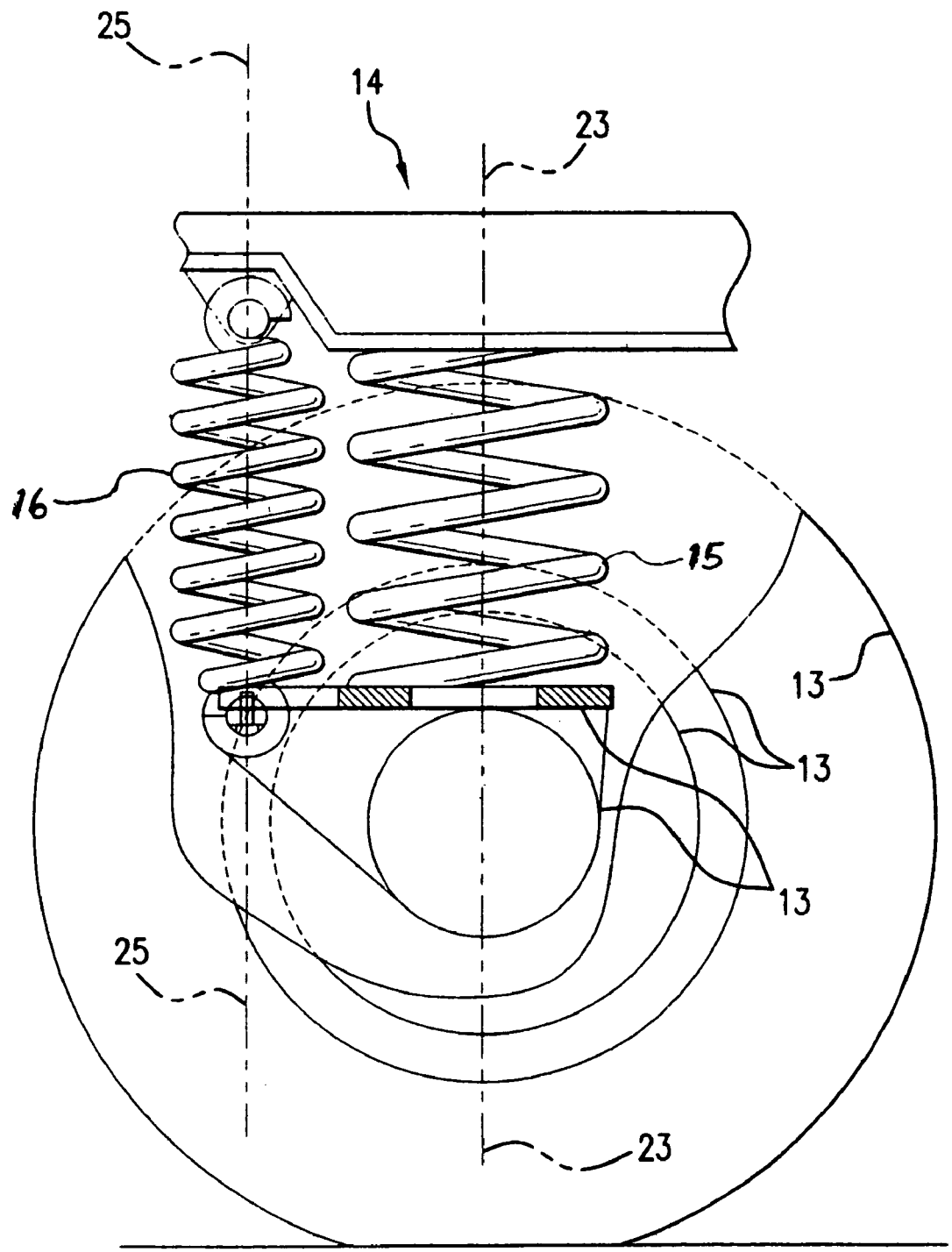
FIG. 4 is a side view of the opposed spring suspension having coil compression and tension springs mounted side by side on a wheel axle support.
Figure 5:
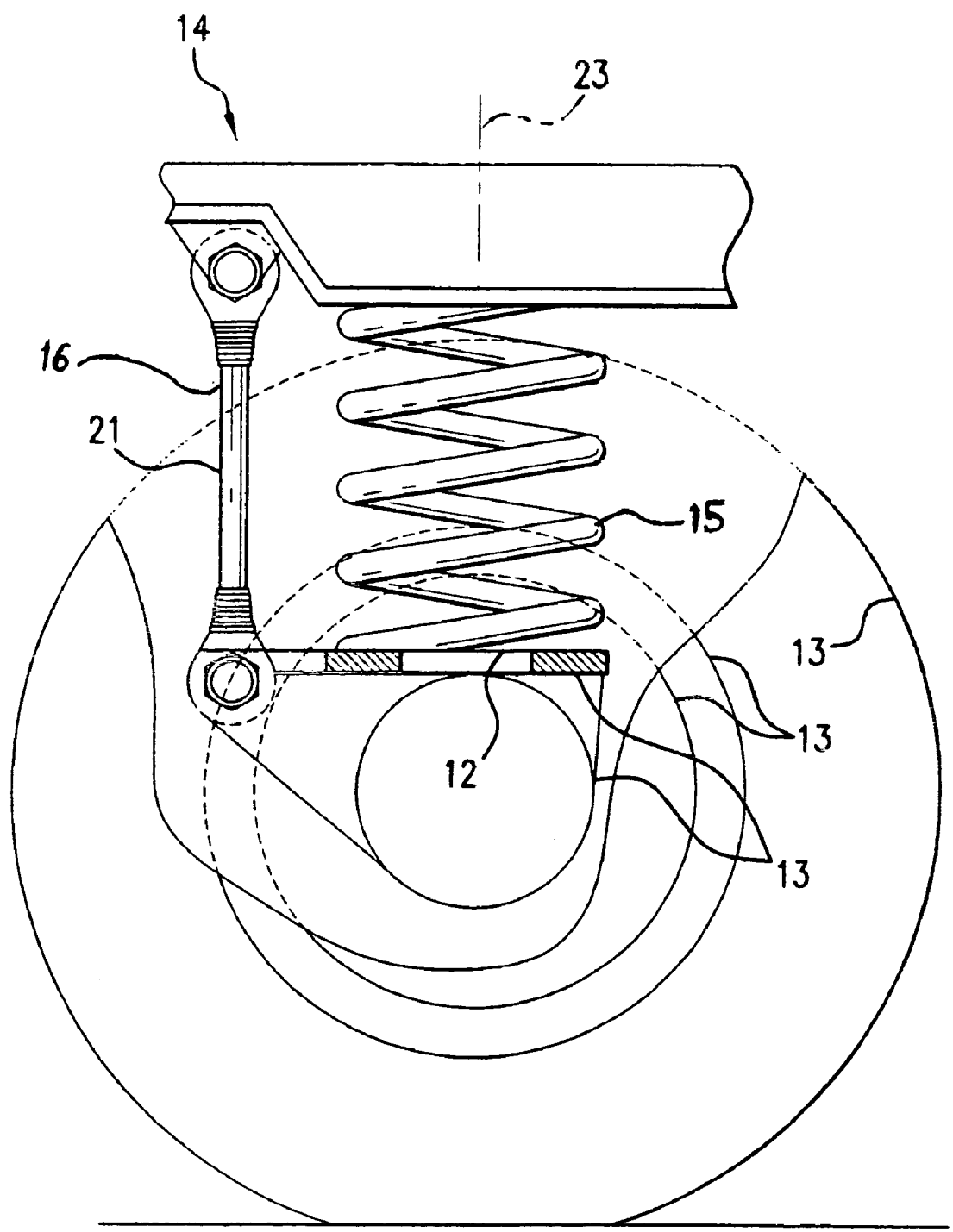
FIG. 5 is a side view of the opposed spring suspension having coil compression and mounted along side is a tension spring comprising of rubber elastic resilient member in tension.

FIG. 3 is a front view of the opposed spring suspension 14 having coil compression and tension springs 18 and 19 respectively mounted coaxial and concentrically in an assembled 20 relationship and for clarity the respective coil springs 18 and 19 are shown individually aside the assembly 20. The resilient member 16 therein is coil spring 19 having its free length of travel preloaded with tension sufficient to maintain its connection between the chassis 11 and the wheel axle support 12 even when the resilient load bolster 15 is compressed to its maximum load capacity, see its separate showings in FIG. 3. The resilient member 16 alternatively is in FIG. 5 an elastic member 21 having its free length of travel stretched sufficiently between the chassis 11 and the wheel axle support 12 to attach thereto even when the resilient load bolster 15 is compressed to its maximum load capacity.

The resilient member 16 could be a torsion spring as in FIG. 6 with torque preloaded sufficiently between the chassis 11 and the wheel axle support 12 to maintain connection there between even when the resilient load bolster 15, if used, is compressed to its maximum load capacity. Typically torsion springs 22 or 22' are pre-twisted to carry the intended static load at a neutral position whereby further load such as jounce will not exceed the ultimate stress and cause permanent deformation of the torsion bar 22 in FIG. 6.

Thus, the concept of overlapping travel as discussed and depicted in the graph of FIG. 2 is not inherent in a single torsion bar or for that matter any other spring suspension even though stretched during rebound movement. In FIG. 6 the load support is shown as two distinct torsion bars 22 and 22' each with a pre-twisted and preloaded to carry either jounce or rebound. Skilled spring makers understand how to make torsion bars 22 or 22' that will provide the load curves of FIG. 2.

The resilient load bolster 15 preferably has an elastic constant of K to carry sprung weight on the wheel axle support 12 and the resilient member 16 has an elastic constant $K_T$ for resisting the rebound motion of the sprung weight 11 over the wheel axle support 12. The relationship of the elastic constant of K to carry sprung weight 11 for jounce and the elastic constant $K_T$ for resisting the rebound motion of the unsprung weight 13 is a function of the amount of roll resistance desired. While a particular example is explained and plotted in FIG. 2, adjustments to the spring constants and travel can be made to adjust for the chassis 11 load for the ride height and the desired stiffness and travel required.

The vehicle opposed spring system 14 is placed between chassis 11 as sprung weight and a plurality of wheel axle supports 12 each carrying a portion of an unsprung weight 13. The opposed spring system 14 preferably has coil load spring 18 mounted between the chassis 11 and each wheel axle support 12 to carry when preloaded the chassis 11 at a preset ride height relative to each wheel axle support 12 in FIGS. 3, 4, 5, 7, 8, 9 and 10. The coil tension spring 19 of FIGS. 3, 4, 5 and 11 is affixed between each wheel axle support 12 and the chassis 11 and it exerts increasing force thereat as a function of the amount of rebound motion of the unsprung weight 13 relative to the chassis 11. The coil tension spring 19 mounts relative to the coil load spring 18 for stretching between the chassis 11 and the wheel axle support 12 in FIG. 3. The coil tension spring 19 applies increasingly less rebound force to the coil load spring 18 during jounce through and beyond the preset ride height of the coil load spring 18 as each coil tension spring 19 resists the rebound motion of sprung weight 13 at each wheel axle support 12, as shown graphically in FIG. 2.

Each coil load spring 18 is coaxial with its respective load spring axis 23 disposed approximately normal to the chassis 11 and each wheel axle support 12, as shown in the assembled arrangement in FIG. 3. Each coil load spring 18 has a concentric volume 24 defined thereby and located there within for disposition of its coil tension spring 19 there within its concentric volume 24 for movement therein without binding with the coil load spring 18 during jounce and rebound.

Each coil load spring 18 is coaxial with load spring axis 23 and approximately normal to the chassis 11, for each wheel axle support 12. A coil tension spring 19 can, as in FIG. 4 be spaced apart from the coil load spring 18 along a tension spring axis 25 generally parallel to the load spring axis 23 of each coil load spring 18. Thus, each coil tension spring 19 may move relative to its respective coil load spring 18 during jounce and rebound as in FIG. 4.

A plurality of coil control springs 19 can be affixed between each wheel axle support 12 and the chassis 11 for exerting increasing force thereat as a function of the amount of rebound motion of the sprung weight relative of the chassis 11. Each coil control spring 19 can oppose its respective coil load spring 18 applying increasingly less rebound force thereto during jounce through and beyond the preset ride height of the coil load spring 18 as each respective coil control spring 19 resists the rebound motion of unsprung weight over its respective wheel axle support 12. In for example FIG. 9 a general arrangement of two compression springs 18 and 19 with a platform 26 in FIGS. 7, 8, 9 and 10 there between can be used as shown or in a McPherson strut arrangement FIG. 10 for steering as well. Paths are defined by each of the lines between the chassis 11 and the wheel axle support 12 for the plural opposed spring assemblies 19 shown in FIG. 12. Along each path each coil load spring 18 and its respective coil control spring 19 jounce and rebound following the line there along as each wheel axle support 12 follows its controlled travel. Each coil control spring 19 has a free length of travel that cooperates with the coil load spring 18 jounce deflection along the line of the path so the free length of travel and the jounce deflection overlap, see FIG. 2 for a graphic showing.

In operation of the opposed suspension 14 of FIG. 9, each wheel axle support 12 includes a rod 27 fixed to the chassis 11 extending along line 28 for supporting the suspension platform 26 see FIGS. 9 and 10. Each suspension platform 26 is disposed in compression and for reciprocation along the path 28 with and between the coil load spring 18 and the coil control spring 19 during jounce and rebound and the suspension platform 26 is affixed to the wheel axle support 12. Thus, two coil springs 18 and 19 in compression support the chassis and body with a compact arrangement of the opposed spring suspension 14.

Comparison of the standard vehicle roll formula to a new one including an added tension spring may be best understood with reference to FIGS. 1 and 2 wherein the terms used hereafter are illustrated and the effects of opposed springs 14 are graphically shown. Thus, FIG. 1 is a schematic representation of an axle as seen in front view with the parameters of the formula disclosed.

The standard formula for vehicle roll equals:

$$2 \times G \times \text{Suspension Height/Suspension Width} \times \text{Spring Load/Spring Rate}$$

In this formula:

G is the gravitational force.

Suspension Height=the distance between the axle centerline and the center of gravity (CG).

Suspension Width equals the distance between spring centers.

In the example calculation below: spring load=800 pounds and spring rate is 100 pounds per inch.

Roll=$2 \times 0.75 \times 12/48 \times 800/100 = 3''$ measured at each spring center for a differential of 6 inches. This is equivalent to approximately 3.5 degrees of roll or twist about the roll center. In this example the body rolled as if the vehicle were rounding a curve such that the compressing of the outer spring and the de-compressing of the inner spring were finally neutralized by the centrifugal displacement of the mass.

In the opposed spring system 14 tension spring 19 is positioned either alongside or along the central axis 23 of the compression spring 18 so that the tension spring 19 travels the same path 23 as the compression spring 18. For example, tension spring 19 with a rate of 75 pounds per inch deployed so it stretches an equal amount to the compression spring 18 travel from its free height reacts against the compression spring 18 at normal ride height. Modifying the formula for body roll to include the reaction caused by the tension spring.

The formula for roll equals:

$$2G \times \text{Suspension Height/Suspension Weight} \times 2\text{Spring Load}/(2K+KT)$$

Here there are two Spring Rates, K is the load spring rate per inch and KT is the tension spring rate per inch.

The relative reduction in body roll equals $2K/2(K+KT)$ and, using the previous example values gives a new resultant body roll of 2.182''

Using this formula:

To reduce the body roll or pitch by 50 percent then KT equals 2K so the roll is halved when the rate of the tension spring 19 equals half the rate of the compression spring 18. Subject to the mass of the unsprung weight 13. Thus demonstrating the effectiveness of using opposing springs 14 to offset the rolling mass of the chassis and body 11 above that axle 12 and for the first time in automotive history also demonstrating a potential benefit of increase in unsprung weight 13.

A method of using the opposed suspension 14 with steps of mounting the bolster 18 between the chassis 11 and the wheel axle support 12 for carrying it when preloaded a preset ride height, affixing resilient member 19 between each wheel axle support 12 and the chassis 11 for exerting increasing force there between as a function of the amount of motion of the unsprung weight 13 relative to the chassis 11, and mounting the resilient member 19 for movement between the chassis 11 and the wheel axle support 12 while applying increasingly less force to the resilient load bolster 18 during jounce while under loading beyond the preloaded at the chassis 11 preset ride height of the resilient load bolster 18 and the resilient member 19 applying increasingly more force resisting the motion of unsprung weight 13 on the wheel axle support 12.

In operation the primary difference, between the opposed spring suspension 14 and existing load carrying spring suspensions, is the involvement of the unsprung mass 13 (i.e. axle/wheels) for controlling the dynamics of the vehicle during cornering. Besides the opposing suspension system 14 at all four corners trying to keep the vehicle level relative to the ground, the unsprung axles now actively participant by virtue of their role as countering mass. Similarly the unsprung masses (front and rear) will also resist forward and aft pitching while braking or accelerating, respectively.

It should be noted:

That wherever there are two compression springs 18 and 19 used, a tension type spring 19 might often be utilized in place of one or both of them. In all the various methods of achieving opposed suspension 14, standard automotive shock absorbers can be incorporated to dampen wheel bounce. The opposing spring suspension 14 is a suspension system that is height controlling and has progressive load carrying capability. There are many ways to achieve the resistance to roll of the chassis 11 using opposing spring suspension 14.

What is claimed is:

1. A vehicle suspension system for use on road and off road placed between a chassis for autos, sport utility vehicles or trucks having a sprung weight and each of a plurality of wheel axle supports carrying unsprung weight, the vehicle suspension system at least operative to independently control motion between the chassis and each wheel axle support during jounce and rebound, the vehicle suspension system including a plurality of load springs having an elastic constant, each load spring located between the chassis and its respective wheel axle support, each of the plurality of respective load springs for supporting the sprung weight of the chassis carried there on at a ride height relative to its respective wheel axle support and for substantially carrying the sprung weight during jounce motion of the chassis, each of the respective load springs mounted to the chassis for flexing between the chassis and its respective wheel axle support for resisting motion of the chassis sprung weight under load and during jounce, the vehicle suspension system for road travel comprising:

a rebound control spring for rebound control resulting from vehicle transients or road conditions mounted to the chassis and each wheel axle support for exerting increasing force to its respective wheel axle support during rebound motion of the sprung weight of the chassis away from its respective wheel axle support, each rebound control spring operatively mounted in opposition to its respective load spring for increasing resistance to chassis sprung weight rebound motion and to initiate the application of resistance to rebound motion of the chassis by transfer of the unsprung weight of each respective wheel axle support through each rebound control spring to the chassis upon motion of the sprung weight away from its respective wheel axle support, the rebound control spring is elastic to stretch sufficiently between the chassis and its wheel axle support even when the load spring is compressed to its maximum load capacity, each respective rebound control spring mounted to oppose the jounce motion of the load spring to provide a transition between the end of jounce motion and the beginning of rebound motion as the rebound motion of the chassis sprung weight caused by reaction to road surface, cornering and braking is resisted by its respective wheel axle support.

2. The suspension system of claim 1 wherein therein the chassis has a substantially rectangular footprint having four wheels disposed generally to carry the corners thereof with each corner having its wheel axle support moveably carried by its respective load spring and its respective rebound spring to resist jounce and rebound at each corner respectively.

3. The suspension system of claim 1 wherein each of the respective rebound control springs includes a coil spring having sufficient jounce and rebound motions to maintain connection with the chassis and its respective wheel axle support even when its respective load spring is compressed to its maximum load position during jounce.

4. The suspension system of claim 1 wherein the rebound control spring is mounted to the chassis and its respective wheel axle support for elastically tethering between the chassis and its respective wheel axle support to maintain connection there between even when the load spring is beyond its maximum load capacity.

5. A method of resisting roll with a vehicle for use on road and off road with a suspension system placed between a chassis for autos, sport utility vehicles or trucks having a sprung weight and a plurality of wheel axle supports each carrying a portion of an unsprung weight, the vehicle suspension system operative along a line of travel between the chassis and the wheel axle support during jounce and rebound, the method having steps comprising:

applying loads to the wheel axle support with a resilient load bolster having an elastic constant K, the resilient load bolster mounted to the chassis;

flexing the resilient load bolster with respect to the wheel axle support with movement along the line of travel under load and during jounce;

carrying with the resilient load bolster when preloaded the chassis at a preset ride height relative to the wheel axle support;

connecting a suspension platform to the wheel axle support;

attaching the suspension platform for bearing against the resilient load bolster;

reciprocating the suspension platform for along the line of travel during jounce and rebound;

attaching a resilient member for rebound control resulting from vehicle transients or road conditions the resilient member having an elastic constant $K_T$ to the suspension [platform] and to the chassis for exerting increasing force on the chassis along the line of travel and against the rebound motion of the sprung weight of the chassis;

applying increasingly less rebound force to the resilient load bolster during jounce through and beyond the preset ride height as the resilient member resists the rebound motion of sprung weight away from the wheel axle support;

operating the resilient member in opposition to the resilient load bolster;

resisting the rebound motion of the sprung weight with motion of the unsprung weight during rebound of the unsprung weight away from the chassis, and mounting the resilient member to oppose at least the initiation of jounce for acting in opposition to the resilient load bolster with the resilient member resisting rebound motion of the chassis away from the wheel axle support caused by reaction to road surface, cornering and braking.

* * * * *